March 14, 1950  A. T. HAMPTON  2,500,491
COMBINATION JAW AND COLLET CHUCK
Filed Nov. 13, 1944  2 Sheets-Sheet 1

Inventor
A.T. Hampton
By Lester L. Sargent
Attorney

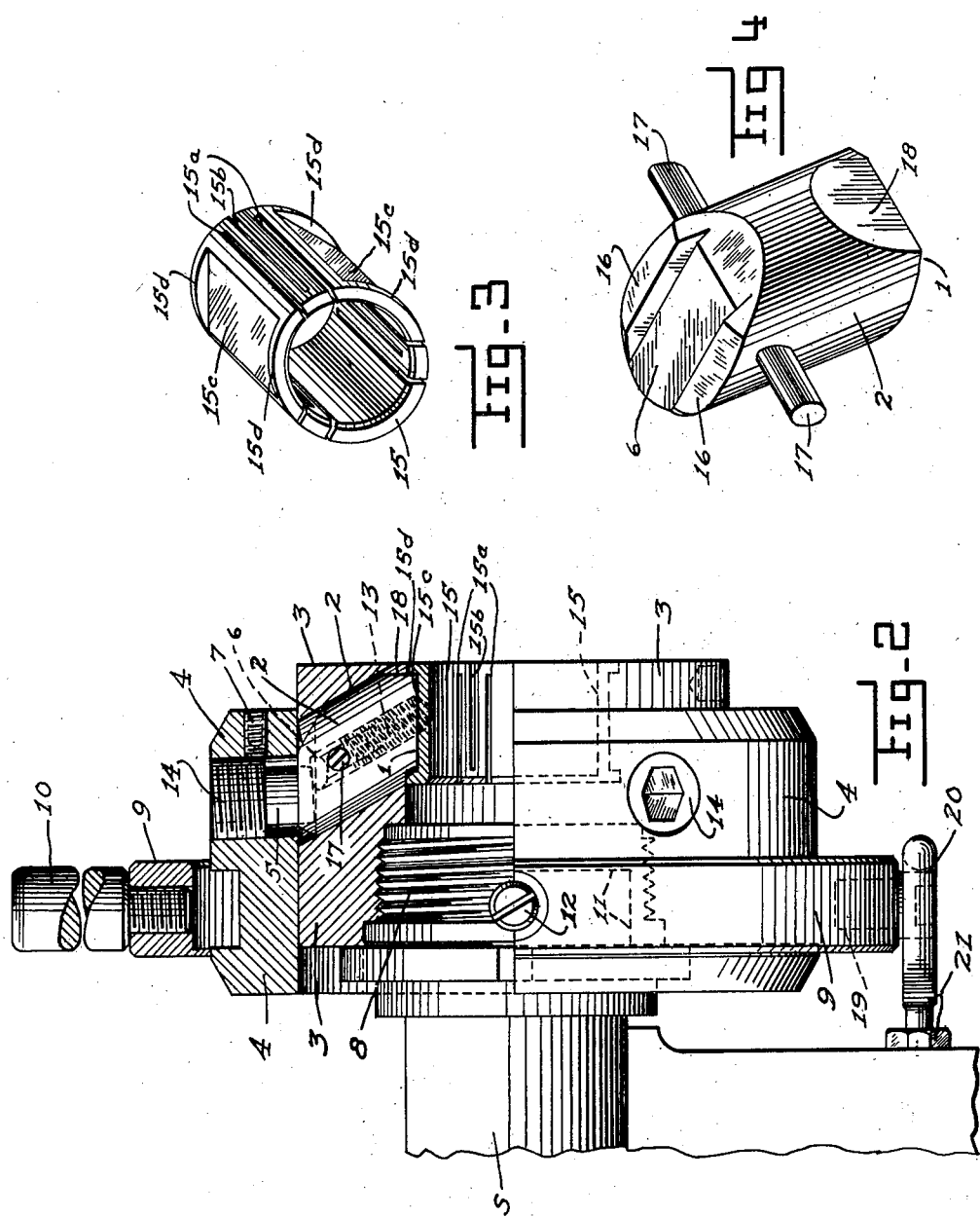

Patented Mar. 14, 1950

2,500,491

UNITED STATES PATENT OFFICE 2,500,491

COMBINATION JAW AND COLLET CHUCK

Andrew T. Hampton, Burbank, Calif., assignor of one-half to Claude Hampton, Burbank, Calif.

Application November 13, 1944, Serial No. 563,225

3 Claims. (Cl. 279—65)

The object of my invention is to provide a combination jaw, chuck, and collet chuck, with independent jaw adjustment, and which may be used with or without collets.

It is also an object of my invention to provide a chuck with jaws that may be opened and closed without stopping the spindle; and to provide a design that is economical to build and which allows of a wide variety of holding surface shapes on the end of the jaws to suit the shape and nature of the material to be held.

It is also an object of my invention to provide an improvement over conventional design in that the center of the collet may be adjusted with relation to the spindle center to compensate for spindle runout and to compensate for errors in chuck manufacturing and in the collet itself. This adjustment also makes it possible to set the collet so as to turn off-center work such as cams and eccentric pins. Also the jaw adjustment in combination with the proper collet design allows of a much wider range of stock diameter variations than is commonly practical.

After adjustment has been made, the chuck can be opened and closed without stopping the spindle. The collets are economical to make as there are no critical angles to hold. The collet may be easily removed without removing the chuck from the spindle.

I attain these and other objects of my invention by the mechanism illustrated in the accompanying drawings, in which—

Fig. 2 is a side elevation of my invention, with a portion of the mechanism shown in section, and with the chuck mounted on a spindle.

Fig. 3 is a detail perspective view of my collet; and

Fig. 4 is a perspective view of one of the jaws of the chuck.

Like characters of reference designate like parts in each of the several views.

Figure 1:
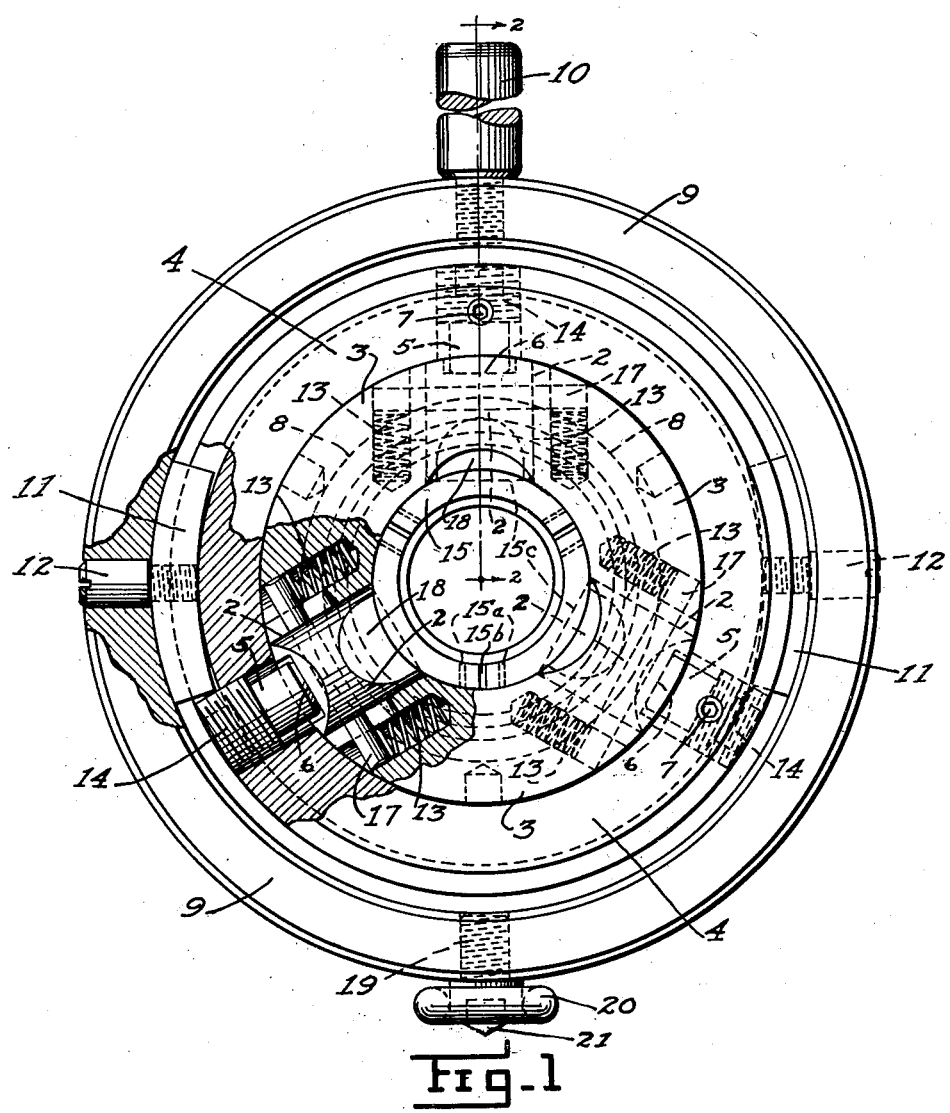
Figure 1 is an end elevation of my invention, with a portion broken away and shown in section.

Referring to the accompanying drawings, I provide a chuck body 3, in which there are mounted a plurality, preferably three, jaws 2, the end surfaces 1 of which may engage the material to be held, or alternatively may engage the flattened surfaces 15c of a collet 15. Mounted on the chuck body 3 is a sleeve 4 that carries adjusting screws 14, corresponding in number with the number of jaws 2 which may be provided for the particular chuck. Each of the adjusting screws 14 are provided with a cylindrical end 5 which engages a recess or groove 6 in the adjacent end 16 of the jaw 2, as shown in Figs. 1, 2 and 4.

Set screws 7 function to secure the adjusting screws 14 in an adjusted position. An adaptor nut 8 is provided by which the chuck is attached to the spindle S. I provide a yoke 9, operated by lever 10 for moving the sleeve 4 on the chuck body 3. Shoe 11 is attached to the ring 9 by pin 12 and rides in an annular groove in the sleeve 4.

As shown in Fig. 1, coil springs 13 are seated in apertures in the chuck body 3, and press against the pin 17 carried by each of the jaws 2, to hold the jaws in an open position. The adjusting screws 14 function to adjust the jaws 2 to the required diameter, their opposite ends operating to engage either the article direct, or the collet, to cause it to engage the material to be held.

The collet 15, as shown in Figs. 2 and 3, is provided with a plurality of series of slots, each set comprising a pair of spaced slots 15a extending from one end of the collet nearly to the other end, and an intermediate slot 15b extending from the other end of the collet, nearly, but not quite, to the opposite end, whereby to permit of some expansion and contraction of the collet under pressure. Intermediate of the several sets of slots, the collet is provided with flattened surfaces 15c, adapted to be engaged by the ends 1 of the jaws. The collet 15 also has projections 15d at each end of the flattened surfaces 15c, adapted to be engaged by the ends 1 of the jaws. The collet 15 is engaged at surfaces 15c by the ends 1 of the jaws 2, as shown in Fig. 2.

As shown in Figs. 1 and 2, I provide an eye-bolt 20, which is secured to the machine, that is the head of the lathe to serve as a socket or pivot point for the socket screw 19 in the yoke 9 to permit of operation of members 10 and 9. The lever 10 is moved to the right to close the jaws 2. It is shown in open position. Sleeve 4 which carries the jaw-closing screws 14 is a slip-fit on the body 3, and is moved by lever 10 and ring 9 and shoe assembly members 11 and 12. The screws 14 slide in the respective grooves 6 of the jaws 2.

The closing travel of the jaws 2 arises from the fact that the bottom of the groove 6 is at a slight angle (preferably one degree) between the surface of the bottom of the groove and the opposite end of the jaw, in each of the jaws. As the sleeve 4 moves out the screws 14 bearing in the grooves 6 cause the jaws 2 to close very slightly giving a wedge effect that causes the jaws to move toward the center a few thousandths of an inch and exert great pressure.

This angle is a "sticking angle" and so the sleeve 4 will remain at the point where the jaws 2 seat on the stock, and will not move until moved back by the operation of the lever 10. The direction and amount of open and closed travel of the jaws 2 may be changed or reversed by changing the angle of the groove 6 in the jaws with relation to the center line of the chuck.

The chuck is attached to the spindle by the adaptor nut 8. Coil springs 13 function to normally hold the jaws 2 in an open position until they are adjusted to a closed position by the adjusting screws 14 which adjust the jaws 2 to the required diameter. The collet is removed and replaced by backing off the screws 14, allowing the jaws 2 to retract.

The jaws 2 are provided with the beveled surface 18 which abuts against the projection 15d of collet 15, as shown in Figs. 2 and 3.

While the chuck is illustrated with three jaws, any desired number of jaws may be used to suit the nature of the work to be performed. The jaws are shown at an oblique angle to the center line of the spindle but may if desired be disposed at right angles to the spindle. The chuck may be designed for any capacity within the range of capacity of the spindle on the particular machine on which it is used. Power may be applied to the operation of the sliding sleeve instead of or in addition to the use of the hand lever shown in the drawings.

What I claim is:

1. In a device of the type described, the combination of means for attaching a chuck body to a spindle, a rigid sleeve mounted on and encircling the chuck body, chuck jaws mounted in the chuck body and disposed at an acute angle to the axis of said body, adjusting screws carried by the sleeve and positioned to engage the outer ends of the chuck jaws, set screws adapted to engage said adjusting screws to retain them in adjusted position, the chuck jaws having their outer ends grooved to receive the ends of the adjusting screws, said grooves being disposed at a slight angle to the axis of the chuck whereby a wedging effect is exerted on the chuck jaws, and a collet having flattened sides engageable by the inner ends of the chuck jaws, and means for operating the sleeve whereby to exert pressure on the chuck jaws, and spring means tending to retract the chuck jaws.

2. A chuck comprising: a chuck body having an operating axis; a plurality of chuck jaws carried by said chuck body and movable relative thereto along transverse paths which radiate from said operating axis, said chuck jaws having inner end surfaces which are adapted to engage an article to be held by the chuck, and having outer ends respectively provided with grooves which are substantially parallel to said operating axis and which have base walls inclined toward said operating axis at slight angles; a rigid, substantially nondeformable sleeve encompassing said chuck body outwardly of said chuck jaws and movable axially of said chuck body; a plurality of contacts carried by said sleeve and extending into said grooves, respectively, into engagement with said inclined base walls thereof, respectively, said contacts cooperating with said inclined base walls to move said chuck jaws inwardly along said transverse paths in response to axial movement of said sleeve in one direction; and means for alternatively moving said sleeve axially of said chuck body in said one direction, or in a direction opposite to said one direction.

3. A chuck comprising: a chuck body having an operating axis; a plurality of chuck jaws carried by said chuck body and movable relative thereto along transverse paths which radiate from said operating axis and which make acute angles with said operating axis, said chuck jaws having inner end surfaces which are adapted to engage an article to be held by the chuck, and having outer end surfaces which are inclined toward said operating axis at slight angles; a rigid, substantially nondeformable sleeve encompassing said chuck body outwardly of said chuck jaws and movable axially of said chuck body; a plurality of contacts carried by said sleeve in positions to engage said inclined outer end surfaces of said chuck jaws, respectively, said contacts cooperating with said inclined outer end surfaces of said chuck jaws to move said chuck jaws inwardly along said transverse paths in response to axial movement of said sleeve in one direction; and means for alternatively moving said sleeve axially of said chuck body in said one direction, or in a direction opposite to said one direction.

ANDREW T. HAMPTON.

REFERENCES CITED

The following references are of record in the file of this patent:

UNITED STATES PATENTS

| Number | Name | Date |
|---|---|---|
| 262,869 | Wertheim | Aug. 15, 1882 |
| 310,987 | Church | Jan. 20, 1885 |
| 1,981,660 | Alson | Nov. 20, 1934 |

FOREIGN PATENTS

| Number | Country | Date |
|---|---|---|
| 720,711 | France | of 1931 |